Figure 1:
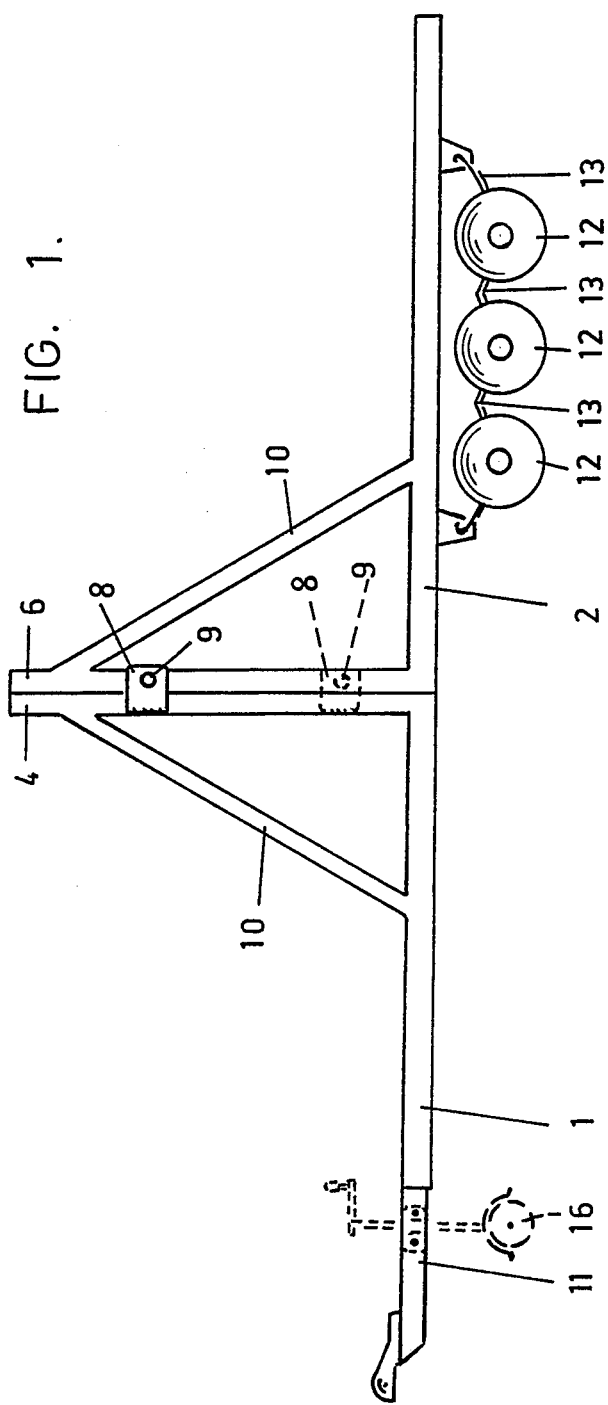

United States Patent [19]

Barber et al.

[11] Patent Number: 4,729,595
[45] Date of Patent: Mar. 8, 1988

[54] MOBILE HOME

[76] Inventors: Arthur B. Barber, 111 Albert St., Strathfield, Australia, N.S.W. 2135; John Loberg, 95 Yanderra St., Condell Park, Australia, N.S.W. 2200

[21] Appl. No.: 883,427
[22] PCT Filed: Oct. 27, 1983
[86] PCT No.: PCT/AU83/00157
  § 371 Date: Jun. 29, 1984
  § 102(e) Date: Jun. 29, 1984
[87] PCT Pub. No.: WO84/01753
  PCT Pub. Date: May 10, 1984

Related U.S. Application Data

[63] Continuation of Ser. No. 626,871, Jun. 29, 1984, abandoned.

[30] Foreign Application Priority Data

Oct. 29, 1982 [AU] Australia .................. PF6591

[51] Int. Cl.⁴ ................................. B62D 63/06
[52] U.S. Cl. ........................... 296/168; 296/26
[58] Field of Search .......... 296/205, 168, 171, 175, 296/26

[56]  References Cited
U.S. PATENT DOCUMENTS

| 2,247,340 | 6/1941 | Webster | 296/168 X |
| 2,797,008 | 7/1957 | Banker | 296/171 X |
| 3,119,638 | 1/1964 | Sneed | 296/168 |
| 3,157,427 | 11/1964 | Reynolds | 296/168 |
| 3,233,935 | 2/1966 | Brindle | 296/168 |
| 3,495,865 | 2/1970 | Hill | 296/168 X |
| 3,655,236 | 4/1972 | Hair | 296/176 |
| 3,737,191 | 6/1973 | Fackre | 296/27 |
| 3,806,147 | 4/1974 | Hanson | 296/168 |

FOREIGN PATENT DOCUMENTS

| 2232508 | 1/1974 | Fed. Rep. of Germany | 296/168 |
| 2658156 | 7/1978 | Fed. Rep. of Germany | 296/168 |
| 567081 | 1/1945 | United Kingdom | 296/205 |

*Primary Examiner*—Robert B. Reeves
*Assistant Examiner*—Carol L. Olson

[57]  ABSTRACT

A mobile home includes two hingedly connected habitable parts each comprising a room-like enclosure mounted on a rectangular perimeter frame. Two braced posts are provided on adjacent end corners of each frame with corresponding posts of the two frames side by side when the parts of the mobile home are aligned end to end. Hinges connect adjacent first posts of the two frames and releasable catches connect the other posts of the two frames thereby allowing the habitable parts to maintain an end to end relationship for towing and alternative side by side relationship for living quarters. Door openings in the habitable parts allow person communication between the habitable areas within the enclosures when the parts are side by side. Wheels are provided on one perimeter frame along with a towing device on an end of the other perimeter frame opposite to that having the posts.

1 Claim, 4 Drawing Figures

MOBILE HOME

This application is a continuation of Ser. No. 626,871, filed June 29, 1984, and now abandoned.

This invention relates to mobile homes by which is meant a structure which will provide habitable areas but which is supported on wheels allowing it to be towed from place to place. Often the term caravan is used for such equipment but mobile homes are larger and more sophisticated than the equipment which is commonly called by the name caravan.

The modern mobile home usually includes internal divisions to provide living areas connected by doorways. Often a mobile home is large enough to include separate bathing, bed and living rooms.

Mobile homes as made hitherto have been limited as to internal configuration because government regulations limit the width of a vehicle that can be towed under normal road conditions. Vehicles in excess of the regulation width are not registered for regular road usage. For the above reasons mobile homes have tended to be narrow compared to their length.

Many parking estates catering for towed mobile homes provide connections for water and electrical power and often waste water connections. Many of the parking estates have been in use for many years and when laid out did not make allowance for mobile homes of the size now used. Accordingly, the owners of many of the latest large mobile homes are excluded from desirable parking estates.

It has however been a feature of nearly all parking estates to provide alongside the area allocated to the mobile home another area on which a tent-like annex to the mobile home was erected. Whilst this provided storage space it was not suitable as a living area during very hot or wet weather.

The present applicants have developed a mobile home which takes advantage of the conventional parking estate arrangement by utilizing both the allocated mobile home position and the annex position for parts of a mobile home which can change configuration between a towing configuration and a living configuration.

Broadly, the present invention provides a mobile home having two habitable parts which when in a first configuration with the parts end to end allow the mobile home to be towed and which when in a second configuration where the parts are side by side provide two intercommunicating rooms; said mobile home comprising a first sub-frame and a second sub-frame which when in a first configuration provide an elongated rigid frame with said mobile home parts respectively located over the sub-frames, hinge means enabling one of said home parts to be moved relative to the other of said home parts to bring normally aligned first sides of those parts into face to face relationship, first releasable locking means engagable when said first sides of the mobile home parts are in alignment so as to retain them in that configuration and second releasable locking means engagable when said first sides are in face to face relationship so as to retain them in that configuration, doorways in said first sides which are aligned when said sides are in face to face relationship, wheels on the sub-frame below said other home part and a tow bar on said one sub-frame adapted to be coupled to a towing vehicle.

Figure 2:
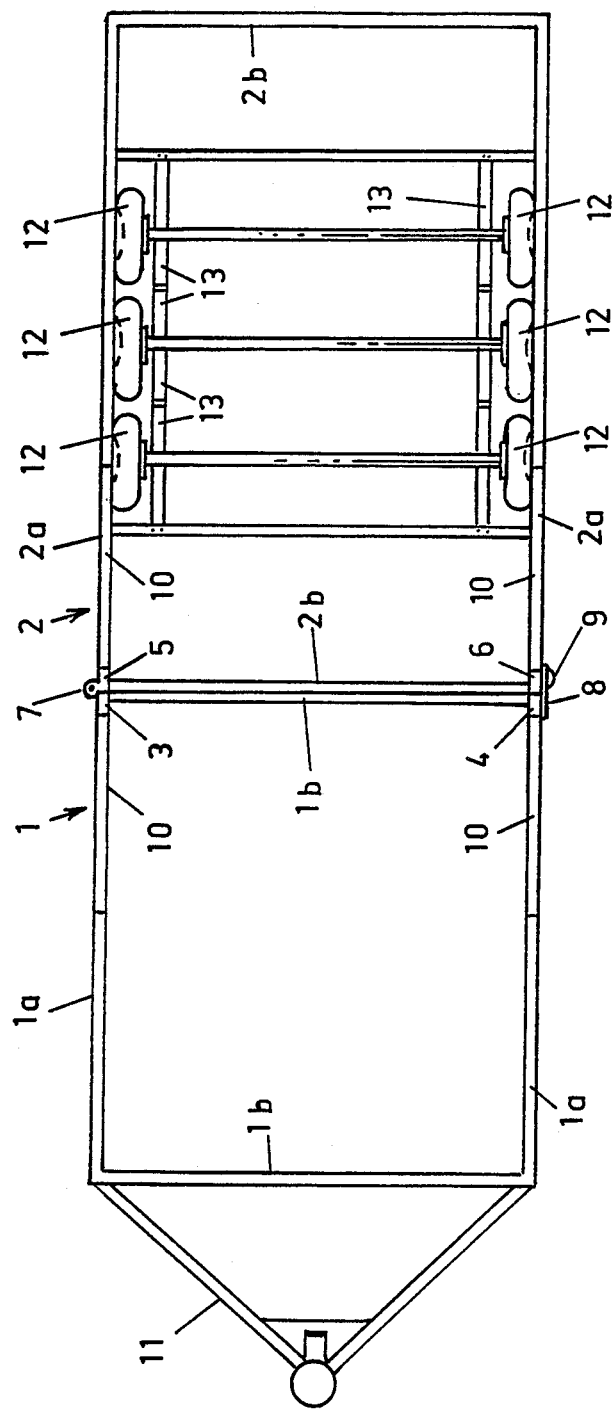
Figure 3:
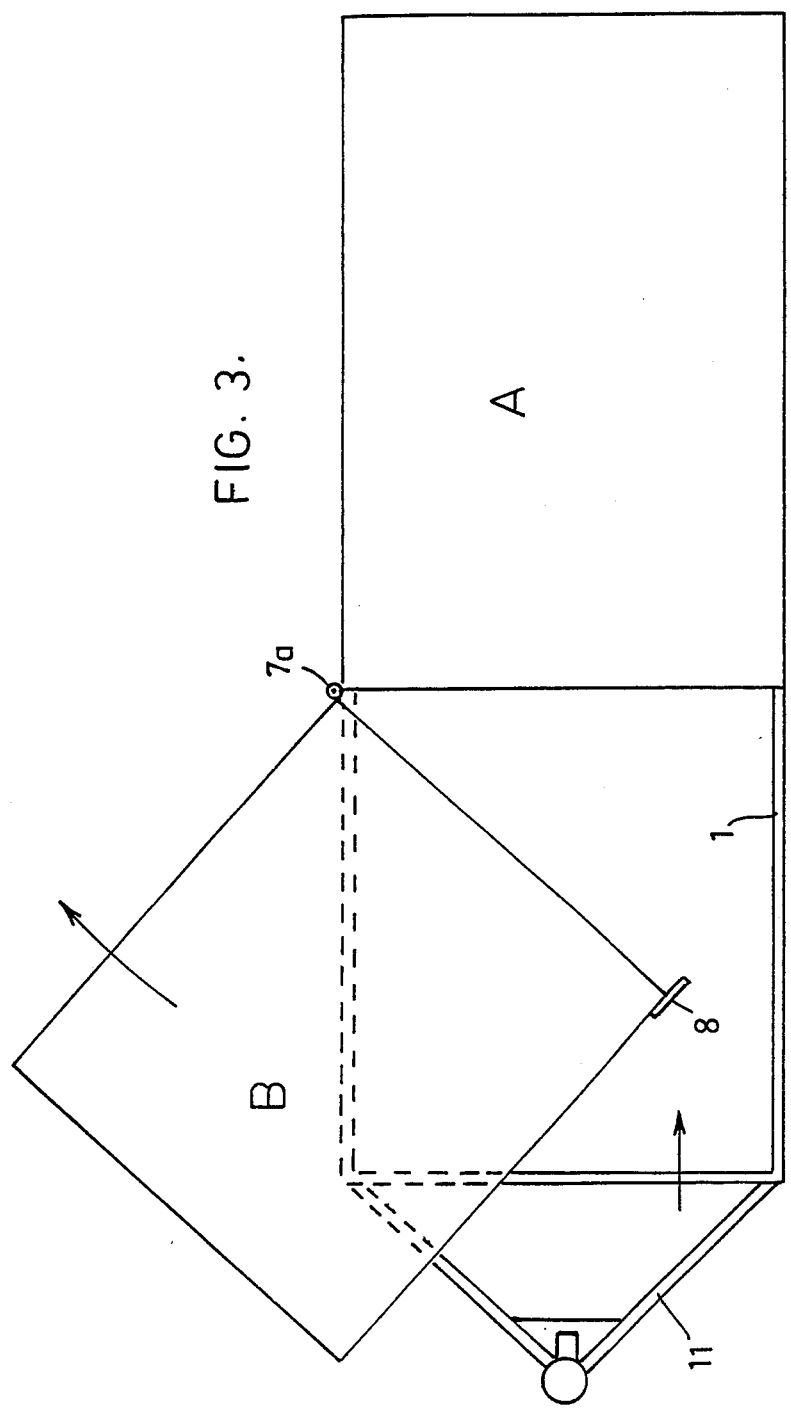
Figure 4:
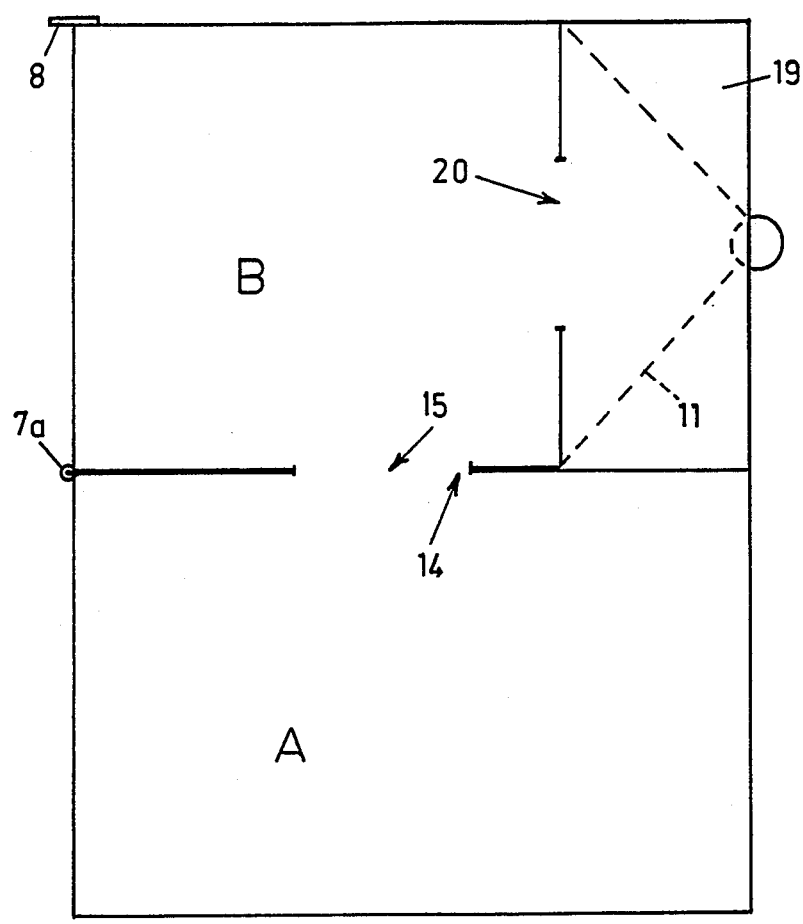

Two presently preferred forms of the mobile home according to the invention will now be described with reference to the accompanying drawings in which:

FIG. 1 is a schematic side elevation of a first form of towing frame, the cladding and its supporting framework and interior fittings of the mobile home not being shown in order to facilitate explanation, FIG. 2 is a plan view of the towing frame as shown in FIG. 1, FIG. 3 is a diagrammatic plan view showing the two part mobile home undergoing a conversion to the configuration adopted for stationary use and where one of the said parts is supported on a frame different from that shown in FIGS. 1 and 2 and FIG. 4 is a view showing a conversion of the assembly of FIG. 2 to the configuration adopted for stationary use.

In the drawings the mobile home is comprised basically of a first perimeter or sub-frame 1 and a second perimeter or sub-frame 2 located end to end with uprights or posts 3 and 4 on the sub-frame 1 located respectively adjacent uprights or posts 5 and 6 on the sub-frame 2.

The perimeter frames 1 and 2 each include a pair of opposed, parallel sides 1a-1a, 2a-2a and first ends 1b'-2b and second ends 1b-2b' respectively. There are hinges 7 coupling the uprights 3 and 5 and there is a plate 8 on the upright 4 which overlies the upright 6 and there is a bolt 9 connecting the upright 6 to the plate 8. If desired several plates 8 and bolts 9 could be used to provide catch means. In this way the sub-frames are rigidly interconnected into elongated towing frame 1-2. The uprights 3 to 6 are tied to the sub-frames 1 and 2 by angle or diagonal braces 10.

At the leading end of the sub-frame 1 there is a tow bar 11 adapted in known manner to be hitched to a towing vehicle. There are wheels 12 coupled through springs 13 to the underside of sub-frame 2. By mounting cladding on skeletal framework erected on the frames 1 and 2 to superstructures are created which form habitable enclosures or living areas. As shown in FIG. 4 there are doorways 14 and 15 in the framework and cladding, which define the living areas A and B, that are aligned when the parts are positioned as shown in FIG. 4 to allow free movement between the areas A and B. Other doorways and windows can be provided as desired.

When a mobile home as proposed reaches a site where it is to be located for some time the towing vehicle is unhitched after a jockey wheel indicated at 16 in FIG. 1 is fixed in place. The jockey wheel can be mounted and de-mounted as required and is usually stored in the towing vehicle during transport of the mobile home from site to site. The next operation is to remove the bolts 9 to allow the sub-frame 1 and its superstructure to be hinged to 7 relative to the sub-frame 2, as shown in FIG. 3. Hinging is continued until the configuration as shown in FIG. 4 is achieved. Infill panels which cover the doorways 14 and 15 during movement of the mobile home on the road may be used for other purposes, as for example panels around a verandah portion of the FIG. 4 arrangement.

The sub-frames 1 and 2 are provided with jacking type levelling legs of any convenient type, not shown, allowing the floors of the living areas A and B to be levelled and made co-planar.

As illustrated the hinging of the parts A and B is achieved by using hinges 7 on the uprights or posts 3 and 5. In another possible configuration the braces or ties 10 are deleted and the posts 3 to 6 are shortened and they project a short distance below the sub-frames 1 and 2. This allows a spaced disposition of hinges 7 above and below the sub-frames 1 and 2. To facilitate the hinging of the part B relative to the part A an upper hinge 7 can be fixed to the adjacent corner posts of the skeletal superstructure supporting cladding of the parts A and B.

As illustrated the sub-frame 1 is shorter than the sub-frame 2, this is however an optional arrangement. There is a fold down panel 19 over the towbar 11 to provide a verandah floor onto which persons using the mobile home can walk through the doorway provided at 20. The panel 19 is preferably retained in an elevated position against the front of the superstructure of living area B during movement of the mobile home on the road.

There is a sealing strip of compressible material (not shown) along the margins of the sides of the living areas A and B which lie in face to face relationship to prevent rain from passing down between the sides when the mobile home is in the FIG. 4 configuration.

FIG. 3 shows a different arrangement of components wherein the sub-frames 1 and 2 are as before except that the sub-frames are not hinged together and the sub-frame 1 is adapted to be a telescopic sliding fit into the sub-frame 2. The living area B is comprised of a clad skeletal frame supported on a structural flooring which normally rests on the sub-frame 1. The skeletal frame or superstructure of the part B is hinged to the skeletal frame or superstructure of the part A, as at 7a, so that upon release of holding down devices (not illustrated but provided to lock the part B to the sub-frame 1 during road transport of the mobile home) the part B can be hinged relative to the part A. FIG. 3 shows a stage in the hinging operation and during the movement of the part B relative to the part A jockey wheels can be mounted under the part B to support it and to reduce the forces acting on the hinges 7a. The jockey wheels are preferably mounted under the part B when in the aligned configuration as shown in FIG. 1 and the sub-frame 1 is then telescopically entered into the sub-frame 2 in direction of the arrow in FIG. 3 thereby allowing unobstructed movement of the jockey wheels supporting the part B whilst it is hinged to obtain the FIG. 4 position.

Hinge connections between the living areas A and B can be of any suitable type and can include adjacent columns in the skeletal frames of the living areas A and B for mounting of the hinge elements.

The foregoing are to be considered as illustrative examples of the presently preferred forms of the invention which in its broadest form has as essential features those set forth in the appended claims.

We claim:

1. A mobile home having two habitable parts which when in a first configuration with the parts end to end allow the mobile home to be towed and when in a second configuration with the parts side by side provide two intercommunicating habitable areas; said mobile home comprising a first rigid rectangular perimeter frame with two parallel sides and a first end and a second end parallel to the first end, a post upstanding from and fixed to the perimeter frame where each side joins said second end, a diagonal brace from each post to the adjacent perimeter frame side, a towbar projecting from said first end of the first perimeter frame, a second rigid rectangular perimeter frame adapted to abut in end to end relationship with the first perimeter frame, the second perimeter frame having two parallel sides and a first end and a second end in parallel relationship, said second perimeter frame having a width from side to side the same as the first perimeter frame, a post upstanding from and fixed to the second perimeter frame where each of its sides join its first end adjacent the first perimeter frame, a diagonal brace extending from each of the posts on the second perimeter frame to the adjacent side of the second perimeter frame, hinge means connecting in a substantially abutting manner one of said posts of the first frame to one of said posts of the second frame to allow the frames to hinge one relative to the other about a vertical axis to allow said frames to pivot from an end-to-end relationship to a side-by-side relationship, releasable catch means connecting the other ones of said posts of the first and second perimeter frames in a substantially abutting manner when said frames are in an end-to-end relationship, wheels on the second perimeter frame, a habitable enclosure on the first perimeter frame and a habitable enclosure on the second perimeter frame, door means in the enclosures including complementing door means in the sides of the habitable enclosures adjacent the hinge means so positioned that when the two habitable enclosures are in a side-by-side relationship communication between habitable areas within the two habitable enclosures is possible by persons.

* * * * *